US012354258B2

(12) United States Patent
Wang et al.

(10) Patent No.: US 12,354,258 B2
(45) Date of Patent: Jul. 8, 2025

(54) MEDICAL IMAGE PROCESSING APPARATUS AND MEDICAL IMAGE PROCESSING METHOD

(71) Applicant: CANON MEDICAL SYSTEMS CORPORATION, Tochigi (JP)

(72) Inventors: Yanhua Wang, Beijing (CN); Bing Li, Beijing (CN); Qilin Xiao, Beijing (CN); Fuyue Wang, Beijing (CN); Gengwan Li, Beijing (CN); Lixin Yan, Beijing (CN); Longfei Zhao, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 358 days.

(21) Appl. No.: 17/814,904

(22) Filed: Jul. 26, 2022

(65) Prior Publication Data
US 2023/0058183 A1    Feb. 23, 2023

(30) Foreign Application Priority Data

Aug. 17, 2021    (CN) .......................... 202110942799.6
Jun. 17, 2022    (JP) ................................. 2022-098168

(51) Int. Cl.
*G06T 7/00*    (2017.01)
*G06T 11/00*    (2006.01)

(52) U.S. Cl.
CPC ............ *G06T 7/0012* (2013.01); *G06T 11/00* (2013.01); *G06T 2207/30101* (2013.01); *G06T 2207/30172* (2013.01)

(58) Field of Classification Search
CPC ........... G06T 11/00; G06T 2207/10081; G06T 2207/10088; G06T 2207/20081; G06T 2207/20084; G06T 2207/20156; G06T 2207/30101; G06T 2207/30172; G06T 7/0012; G06T 7/11
USPC ......................................................... 382/128
See application file for complete search history.

(56) References Cited

U.S. PATENT DOCUMENTS

| 9,788,729 | B2 | 10/2017 | Waku et al. |
| 2010/0128963 | A1 | 5/2010 | Waku et al. |
| 2010/0239140 | A1* | 9/2010 | Ruijters ................. G06T 19/00 |
| | | | 382/130 |
| 2017/0178405 | A1 | 6/2017 | Taerum et al. |
| 2017/0270705 | A1* | 9/2017 | Hopfgartner ........ A61B 6/5211 |
| 2019/0221013 | A1* | 7/2019 | Fukuda ..................... G06T 5/70 |

FOREIGN PATENT DOCUMENTS

CN    101732061 A    6/2010

* cited by examiner

*Primary Examiner* — Ajibola A Akinyemi
(74) *Attorney, Agent, or Firm* — Oblon, McClelland, Maier & Neustadt, L.L.P.

(57) ABSTRACT

A medical image processing apparatus according to an embodiment includes processing circuitry configured: to generate a projection image by implementing an intensity projection on a plurality of two-dimensional images structuring three-dimensional volume data rendering a tubular organ; to obtain a mapping matrix of the intensity projection; to annotate the tubular organ in the projection image; and to identify the tubular organ in the three-dimensional volume data, by inversely mapping the tubular organ annotated in the projection image onto the three-dimensional volume data while using the mapping matrix.

10 Claims, 10 Drawing Sheets

| 0 | 0 | -1 | 0 | 0 | 0 | 0 | 0 |
|---|---|----|---|---|---|---|---|
| 0 | -2 | 1 | 2 | 0 | 0 | 0 | 0 |
| 0 | 0 | -1 | 0 | 1 | 0 | 0 | 0 |
| 0 | -2 | 1 | 2 | 0 | -1 | 2 | 0 |
| 0 | 0 | -1 | 0 | 0 | 0 | -2 | 0 |
| 0 | -2 | 1 | 2 | 0 | 0 | 0 | 0 |
| 0 | 0 | -1 | 0 | 0 | 0 | 0 | 0 |
| 0 | -2 | 1 | 2 | 0 | 0 | 0 | 0 |

INDEX MAPPING MATRIX OF LMIP

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from Chinese Patent Application No. 202110942799.6, filed on Aug. 17, 2021; and Japanese Patent Application No. 2022-98168, filed on Jun. 17, 2022, the entire contents of all of which are incorporated herein by reference.

FIELD

Embodiments described herein relate generally to a medical image processing apparatus and a medical image processing method.

BACKGROUND

Organs and tissue structures of the human body include tube-shaped organs and tissue structures, such as blood vessels and the trachea, for example. In the present disclosure, those tube-shaped organs and tissue structures will collectively be referred to as tubular organs. In diagnosis processes and surgical operations for diseases related to a tubular organ (e.g., a blood vessel), accurate annotation and segmentation of the tubular organ in a medical image, especially in three-dimensional volume data, have an extremely important value.

Patent Literature 1 (US 2017/0178405) discloses an annotation method for a centerline of a tubular structure. In Patent Literature 1, a contrast agent is injected into a blood flow to strengthen image display of a blood vessel centerline. Further, in Patent Literature 1, an iteration algorithm is used for finding a path from a start position to an end position located on the tubular structure centerline. According to a method such as that disclosed in Patent Literature 1 by which a traditional (e.g., iteration) algorithm is used for tracing the single centerline of the blood vessel on the basis of the start point and the end point, it is difficult to trace the blood vessel centerline, when the blood vessel is a very small blood vessel, a curved blood vessel, or an intersecting blood vessel.

Patent Literature 2 (CN 101732061) discloses an image processing apparatus and an image processing method that can be used in image diagnosis processes of blood vessel diseases. Patent Literature 2 provides techniques for generating data of a display image from volume data, on the basis of a line-of-sight direction and a line-of-sight position that are determined. Among those is a technique for generating data of a display image by performing three-dimensional image processing on the volume data, such as a Multiplanar Reconstruction (MPR) process, a Curved Planar Reconstruction (CPR) process, a Stretched CPR (SPR) process, volume rendering, surface rendering, or a Maximum Intensity Projection (MIP). Patent Literature 2 further describes arranging a label with a blood vessel. The blood vessel label in Patent Literature 2 is a note displayed over a display image to indicate an anatomical classification name of a blood vessel branch.

Conventional techniques further include other methods related to annotation and segmentation of tubular organs such as blood vessels. In particular, in recent years, annotation and segmentation methods for tubular organs using data-driven Artificial Intelligence (AI) have been proposed. However, because tubular organs such as blood vessels have complicated geometrical and topological changes and include very small structures, annotating blood vessels in three-dimensional volume data still imposes a very difficult problem.

To manually implement blood vessel annotation in images structuring three-dimensional volume data, it is necessary to browse a plurality of images and to inspect one by one from the root point to the end point of a blood vessel, which requires an extremely long period of time. According to conventional techniques such as the technique in Patent Literature 1, the traditional algorithm is used for segmenting a blood vessel, so as to subsequently edit the segmented result manually to arrive at Ground Truth (GT). However, the quality of GT in a published data set may not be very high in some situations. Further, because blood vessels have complicated shapes and very small structures, and may include noise, disease noise waves, and/or the like, it also takes an extremely long period time to humanly inspect and correct blood vessel GT, which lowers efficiency.

Figure 1:
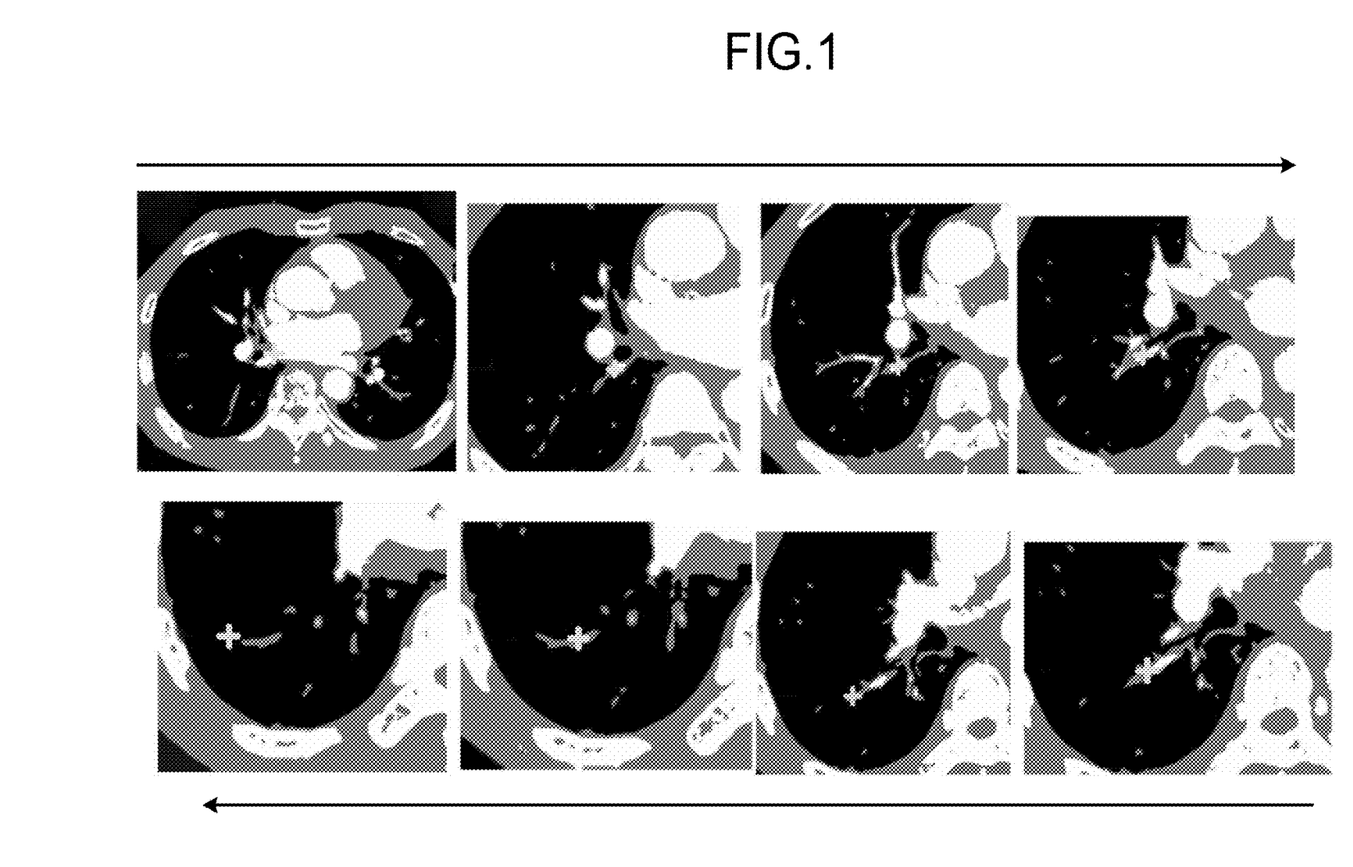
FIG. 1 is a conceptual drawing for explaining the method according to a conventional technique by which the three-dimensional blood vessel annotation is implemented manually.

FIG. 1 is a drawing for explaining a method according to a conventional technique by which three-dimensional blood vessel annotation is implemented manually. For example, FIG. 1 illustrates a plurality of successive scan images of pulmonary blood vessels in a human body. When manually implementing blood vessel annotation, a user needs to successively browse, in one image after another, from the root to branches of one blood vessel, in the sequential order indicated by the arrow in the drawing and to also trace blood vessel points of the blood vessel formed in the images. However, because the images contain other blood vessels and noise waves, the tracing process can be difficult. Thus, there is always a chance that the user may lose track of the traced elements, and smaller branches can easily be missed. Although the user may be able to successfully obtain the blood vessel centerline from the tracing process, it is an extremely time consuming process.

DETAILED DESCRIPTION

Embodiments will present a tubular organ annotation method based on guidance by a local intensity projection, a method for correcting a tubular organ annotation result, and a system. Included are: generating, at first, local maximum/minimum intensity projection (LMIP) images of a tubular organ such as a blood vessel; extracting an index mapping matrix between the local maximum/minimum intensity projection (LMIP) images and original three-dimensional volume data; a user subsequently annotating a key point (a landmark) on a centerline of the tubular organ in each of the LMIP images; further obtaining seed points of the blood vessel centerline by inversely mapping the annotated key point of the centerline onto the original three-dimensional volume data while using the index mapping matrix; obtaining the blood vessel centerline by performing a fitting process while using the obtained seed points of the blood vessel centerline; and completing three-dimensional annotation on the blood vessel under guidance of the blood vessel centerline.

More specifically, at least one aspect of the embodiments provides a tubular organ annotation method including: a projection step of obtaining a projection image by implementing a local intensity projection on two-dimensional images structuring three-dimensional volume data rendering a tubular organ; a mapping matrix obtaining step of obtaining a mapping matrix of the local intensity projection implemented in the projection step; an annotation step of annotating the tubular organ in the projection image; and an inverse mapping step of generating a three-dimensional tubular organ image by inversely mapping the tubular organ annotated in the projection image onto the three-dimensional volume data while using the mapping matrix.

With this arrangement, according to at least one aspect of the embodiments, while making use of the characteristic where the local intensity projection is able to strengthen intensities of the tubular organ (e.g., a blood vessel or the trachea) and connectivity of geometrical shapes in the images, the key point on the centerline of the tubular organ is annotated in the LMIP images, so that the centerline of the tubular organ is easily distinguished from other noise waves (other blood vessels/diseased regions/noise), while the LMIP strengthens the geometrical connectivity. It is therefore possible to annotate even very small blood vessel points. By inversely mapping the center points annotated by the LMIP onto the original image while using the constructed index relationship mapping matrix, the centerline of the tubular organ in a three-dimensional space is generated.

Another aspect of the embodiments provides a tubular organ annotation result correcting method including: an input step of receiving an input of three-dimensional volume data rendering a tubular organ and a preliminary annotation result obtained by annotating, in advance, the tubular organ in the three-dimensional volume data; a projection step of obtaining a projection image by implementing a local intensity projection on two-dimensional images structuring the three-dimensional volume data; a mapping matrix obtaining step of obtaining a mapping matrix of the local intensity projection implemented in the projection step; a comparing step of obtaining a missing part of the tubular organ in the preliminary annotation result by comparing the projection image with the preliminary annotation result; an annotation step of annotating the missing part of the tubular organ in the projection image; and an inverse mapping step of generating a three-dimensional tubular organ image by inversely mapping the missing part of the tubular organ annotated in the projection image onto the three-dimensional volume data while using the mapping matrix and further combining a result of the inverse mapping with the preliminary annotation result.

Any of the embodiments may be realized as a tubular organ annotation system, a tubular organ annotation result correcting system, or an apparatus including functional modules capable of realizing the steps in the abovementioned method, may be realized as a computer program that causes a computer to execute the steps included in the abovementioned methods, or may be realized as a recording medium that has recorded thereon the abovementioned computer program.

According to at least one aspect of the embodiments, the key point on the centerline of the tubular organ is annotated in the LMIP images, so that the centerline of the tubular organ is easily distinguished from other noise waves (other blood vessels/diseased regions/noise), while the LMIP strengthens the geometrical connectivity. It is therefore possible to annotate even very small blood vessel points. By inversely mapping the center points annotated by the LMIP onto the original image while using the constructed index relationship mapping matrix, the centerline of the tubular organ in a three-dimensional space is generated.

The embodiments are related to the tubular organ annotation, the tubular organ annotation result correcting method, and the system. It is possible to realize any of these methods by causing an apparatus having a Central Processing Unit (CPU) such as an independent computer to execute a software program. It is possible to realize any of the systems as the abovementioned independent computer. It is also possible to realize any of the abovementioned methods in the form of hardware as circuitry capable of realizing the steps in the methods. Additionally, it is also possible to install, in advance, any of the systems according to the embodiments, in a medical image acquiring apparatus such as a Magnetic Resonance Imaging (MRI) apparatus, as a part of the medical image acquiring apparatus.

Some of the elements that are the same as each other in mutually-different embodiments will be referred to by using the same drawing reference characters, and duplicate explanations thereof will be omitted as appropriate.

Before explaining specific embodiments, a Local Maximum/Minimum Intensity Projection (LMIP), which serves as a basis of the embodiments, will be explained at first. The local maximum/minimum intensity projection is an example of a local intensity projection.

A Maximum/Minimum Intensity Projection (MIP) is one of Direction Volume Rendering (DVR) methods. This method makes it possible to visualize volume data by projecting a maximum/minimum intensity of an emitted light beam onto a projection plane and is thus widely used in the field of medical image processing and the like.

The local maximum/minimum intensity projection used in the embodiments is an improved MIP scheme by which a method similar to the MIP is implemented on a part of volume data instead of complete volume data, so as to obtain a projection image as a result of projecting maximum/minimum intensities in the partial volume data onto a projection plane when a virtual beam sequentially passes through the partial volume data.

In the following sections, a local intensity projection according to the embodiments will be explained in detail, by using an example of a local maximum intensity projection with reference to FIG. 2. The type of the volume data used in the following description is not particularly limited, but may be Computed Tomography (CT) images or Magnetic Resonance Imaging (MRI) images, for example.

Figure 2A:
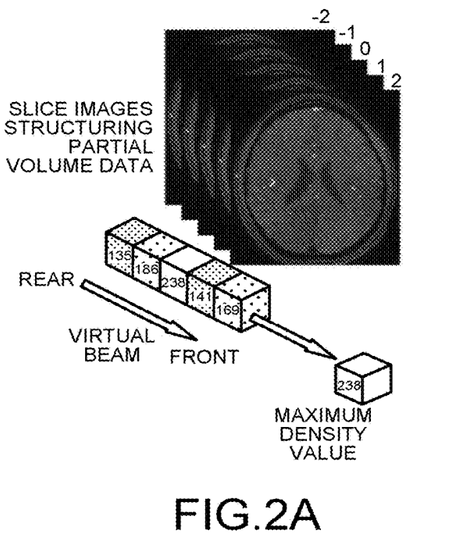
FIG. 2A is a conceptual drawing for explaining a concept of a maximum intensity projection.
Figure 2B:
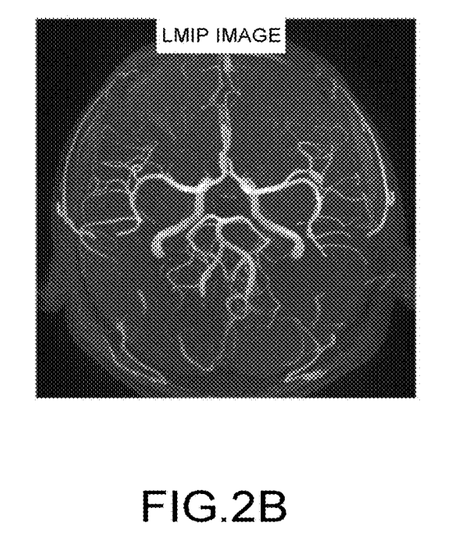
FIG. 2B is a conceptual drawing for explaining a concept of a maximum intensity projection.

As illustrated in FIG. 2A, let us imagine that a single virtual beam is emitted from the rear to the front in a direction (hereinafter, "slice direction") perpendicular to the slice images illustrated in the drawing, onto five slice images structuring a part of volume data, for example. In this situation, an LMIP image serving as a projection image is formed as a result of projecting a maximum intensity among the slice images through which the light beam has passed, onto a projection plane. For example, FIG. 2A indicates that, when the pixel values in a certain image position in the five slice images are 135, 166, 238, 141, and 169, the maximum value "238" among the pixel values of the five slice images is determined as a pixel value in that pixel position within the LMIP image. This process is performed on all the pixels in the slice images, so as to eventually obtain an LMIP image in the slice direction as illustrated in FIG. 2B. As apparent from the drawing, the projection image resulting from the LMIP process evidently strengthens intensities and geometrical shape connectivity of the blood vessels and thus makes it possible to clearly distinguish a blood vessel centerline from other noise waves (other blood vessels/diseased regions/noise).

Figure 2C:
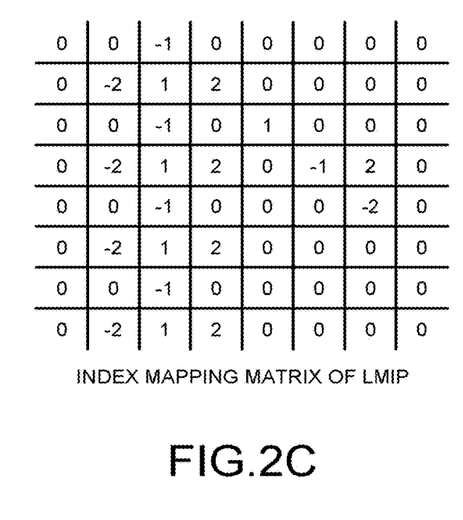
FIG. 2C is a conceptual drawing for explaining a concept of a maximum intensity projection.

When a local maximum intensity projection image is generated by using N slice images, the pixel value in each of the pixel positions in the projection image is derived from a certain image having the maximum pixel value in that position among the N slice images. Accordingly, it is possible to create a table as illustrated in FIG. 2C by bringing an image number of the slice image from which the pixel value in each of the pixel positions within the LMIP image is derived, into correspondence with the pixel position. This table is an index mapping matrix (which hereinafter may simply be referred to as "mapping matrix") of the LMIP according to the embodiments.

According to a rule for numbering the image numbers in the embodiments, as illustrated in FIG. 2A, a middle image number among the plurality of successive slice images is determined as "0", so that the other images are sequentially numbered as Image 1, Image −1, Image 2, Image −2, and so on forward and rearward in ascending order of the distances from Image 0. For example, when there are more than one image corresponding to the maximum pixel value in a certain pixel position, it is possible to determine an image having a larger ordinal number among the images having the maximum pixel value, as an index value of the position. For example, when the pixel values in a certain pixel position are the same between Image 1 and in Image −1 while both of the pixel values are the maximum pixel value, the index in that pixel position is determined to be "1" when the mapping matrix is structured.

The rule for numbering the images and the definition of the front and the rear directions are merely examples. Needless to say, other configurations are also applicable to the embodiments. The mapping matrix in the embodiments is sufficient as long as it is indicated, with respect to each of the pixels in a projection image, which one of a plurality of two-dimensional images used for generating the projection image, the pixel value of the pixel is derived from. In other words, it is sufficient when the mapping matrix indicates, with respect to each of the pixels in the projection image, a correspondence relationship as to which one of the plurality of two-dimensional images used for generating the projection image corresponds to the pixel.

As illustrated in FIG. 2C, the mapping matrix in the present embodiments indicates, with respect to each of the pixels in a projection image, which one of the plurality of two-dimensional images used for generating the projection image, the pixel value of the pixel is derived from. In an example where each of the slice images has 8*8 pixels, because the value in the cell at the lowest left corner (in the table position 0,0) is 0, it is indicated that the pixel value in the pixel position (0,0) (i.e., the position in the lowest left corner) within the LMIP image is derived from Image 0. In other words, among the five images in total, the pixel value in the pixel position (0,0) is maximum in image 0. Similarly, because the value in the adjacent cell positioned to the right of the cell at the lowest left corner is −2, it is indicated that the pixel value in the pixel position (0,1) (i.e., the adjacent pixel position to the right of the lowest left corner) within the LMIP image is derived from Image −2. In other words, among the five images in total, the pixel value in the pixel position (0,1) is maximum in Image −2.

Figure 2D:
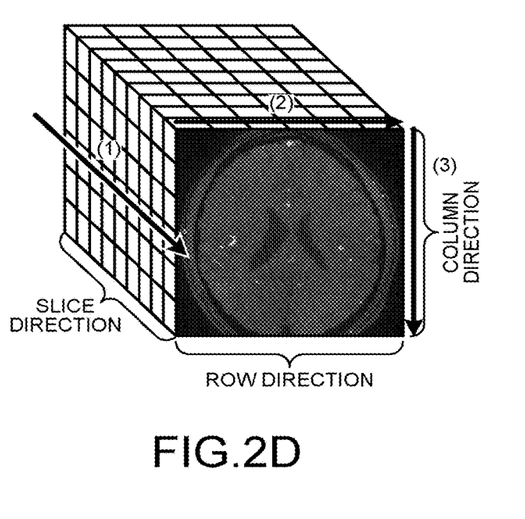
FIG. 2D is a conceptual drawing for explaining a concept of a maximum intensity projection.

Further, as illustrated in FIG. 2D, in an example of three-dimensional volume data, it is possible to obtain LMIP images in a row direction and a column direction by similarly implementing LMIP projection imaging in the row direction and the column direction (i.e., directions (2) and (3) in FIG. 2) that are perpendicular to the slice direction, in addition to the abovementioned slice direction (direction (1) in FIG. 2).

As explained above, the LMIP is not only capable of reconstructing a continuous blood vessel from blood vessel points in the slices images, but also capable of displaying relatively small density changes in the MIP image while strengthening the contrast. It is therefore possible to display stenosis, expansion, damages, or the like of blood vessels, for example, in an excellent manner. The LMIP is therefore particularly suitable for the image reconstruction of a tubular organ such as a blood vessel.

The local intensity projection according to the embodiments has thus been explained while using the example of the local maximum intensity projection. A local maximum intensity projection is used in the situation where, as illustrated in FIG. 2, a target part (the blood vessel) is bright in the image, i.e., the target part has higher intensities than the background. Conversely, a local minimum intensity projection is used in the situation where a target part (the blood vessel) is dark in the image. The difference between the local minimum intensity projection and the local maximum intensity projection lies only in that, as the pixel value in each of the pixel positions within a projection image, a minimum value, instead of a maximum value, in the pixel position is extracted from among the pixel values in the slice images through which a light beam passes. Because the other configurations are the same as those of the local maximum intensity projection, details thereof will not be explained specifically.

Both the local maximum intensity projection and the local minimum intensity projection are applicable to the embodiments. In all of the following embodiments, a local maximum intensity projection is explained as the LMIP. However, as apparent to a person skilled in the art, it is possible to similarly arrive at the technical proposals of the embodiments by replacing any of the local maximum intensity projections in the technical proposals with a local minimum intensity projection. It is also possible to similarly achieve the technical advantageous effects of the embodiments.

Next, the following will describe specific modes of carrying out the embodiments.

First Embodiment

A first embodiment is related to a tubular organ annotation method including: a projection step of obtaining a projection image by implementing a local intensity projection on two-dimensional images structuring three-dimensional volume data rendering a tubular organ; a mapping matrix obtaining step of obtaining a mapping matrix of the local intensity projection implemented in the projection step; an annotation step of annotating the tubular organ in the projection image; and an inverse mapping step of generating a three-dimensional tubular organ image by inversely mapping the tubular organ annotated in the projection image onto the three-dimensional volume data while using the mapping matrix.

The following will describe the first embodiment in detail, with reference to drawings.

Figure 3:
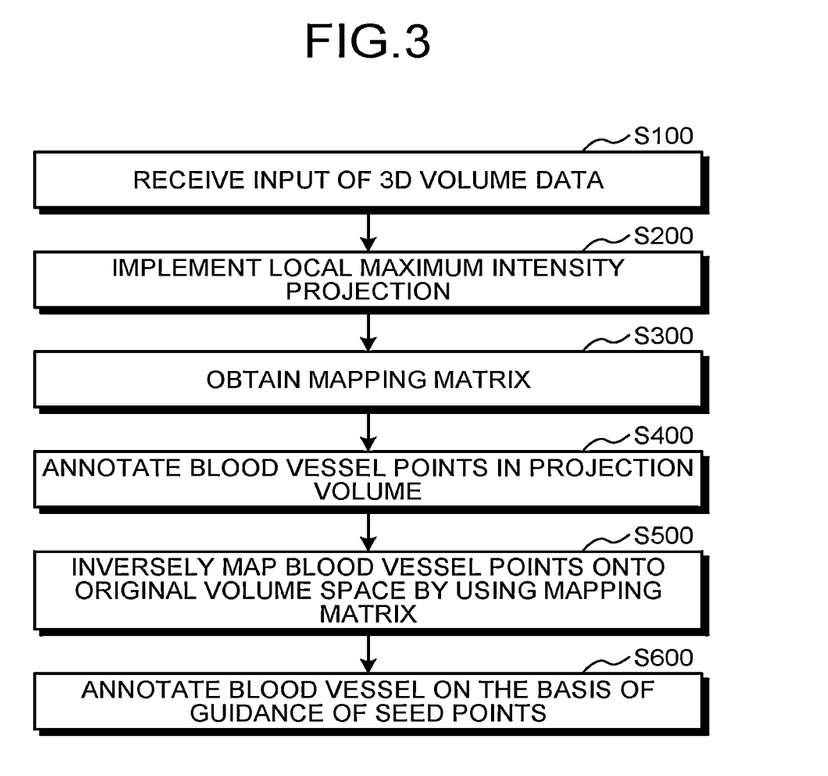
FIG. 3 is a flowchart illustrating a tubular organ annotation method according to a first embodiment.

FIG. 3 is a flowchart illustrating the tubular organ annotation method according to the first embodiment. The first embodiment will be explained while using an example of annotation of a blood vessel.

As illustrated in FIG. 3, the tubular organ annotation method of the embodiment includes: step S100 at which an input of the original three-dimensional volume data rendering the blood vessel is received; step S200 at which the LMIP image is obtained by implementing, for example, a local maximum intensity projection on a plurality of slice images that are successive in a certain direction; step S300 at which the projection mapping matrix of the local maximum intensity projection implemented at step S200 is obtained; step S400 at which a centerline of the blood vessel is annotated in the LMIP image; step S500 at which seed points of the blood vessel centerline in the slice images are obtained, by inversely mapping points on the centerline onto the original slice images on the basis of the blood vessel centerline annotated in the LMIP image at step S400, while using the mapping matrix obtained at step S300; and step S600 at which three-dimensional (3D) blood vessel annotation is completed under guidance of the obtained seed points.

In the following sections, the abovementioned steps will be explained in detail, with reference to drawings.

Figure 4:
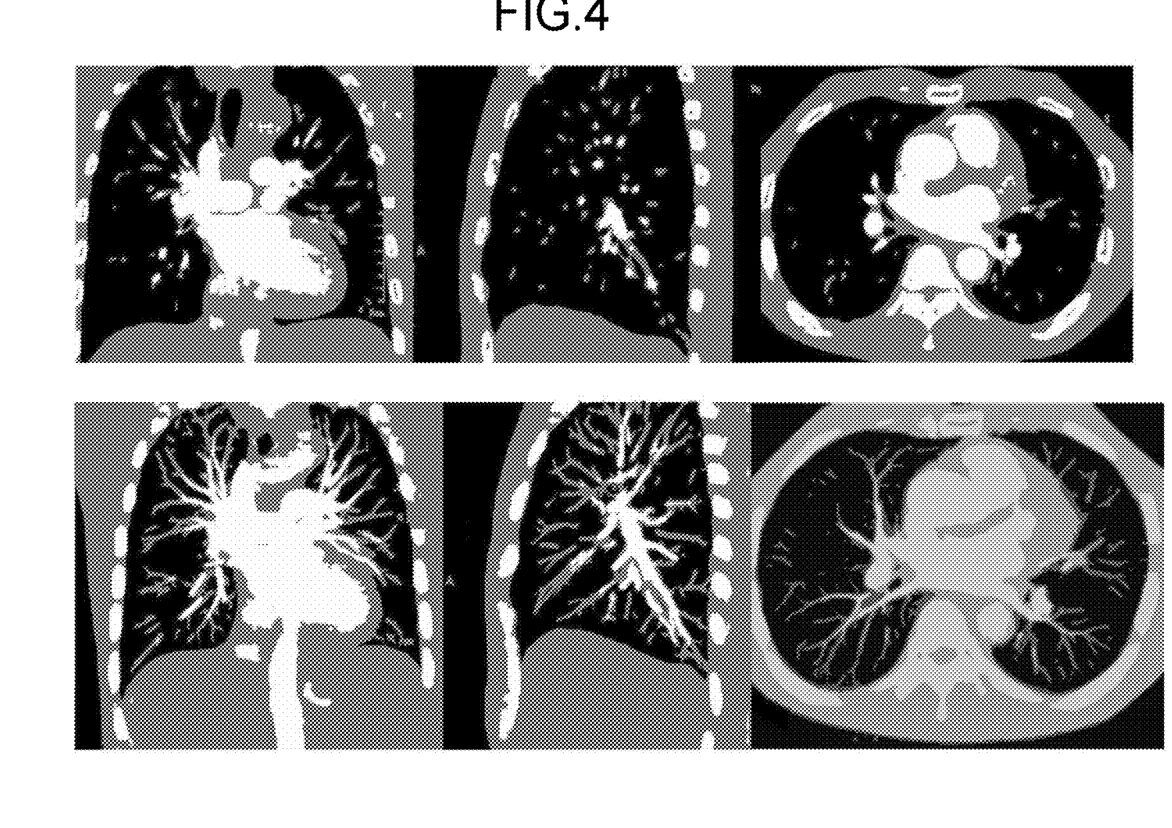
FIG. 4 is a conceptual drawing illustrating an advantageous effect of a local maximum intensity projection at step S200.

Because the details of the implementation of the local maximum intensity projection and obtaining the projection mapping matrix of the local maximum intensity projection at steps S200 and S300 have already been explained above with reference to FIG. 2, the detailed explanations will not be repeated. FIG. 4 is a conceptual drawing illustrating an advantageous effect of the local maximum intensity projection at step S200.

The three images in the top section of FIG. 4 are axial, sagittal, and coronal scan slice images of pulmonary blood vessels in a human body. The three images in the bottom section are local maximum intensity projection images obtained by implementing the local maximum intensity projection, respectively, on the plurality of scan slice images that are namely the axial, sagittal, and coronal images. As understood from the drawing, the LMIP image obtained by implementing the local maximum intensity projection at certain intervals strengthen blood vessel intensities and geometrical connectivity. In the LMIP image, it is therefore possible to easily annotate the blood vessel centerline. In this situation, when the local maximum intensity projection is implemented in the embodiment, it is possible to select arbitrary directions from among directions including the three directions of the axial, sagittal, and coronal directions as well as other directions designated by a user. It is possible to select the direction in which the LMIP is implemented in accordance with the extending direction of the tubular organ (e.g., the blood vessel), for example. When the angle formed by the extending direction of the blood vessel and a plane direction in which the scan slice images are present is relatively large (e.g., close to perpendicular), it will be possible to obtain a complete centerline of the blood vessel by implementing the LMIP process on a larger number of slice images. On the contrary, when the angle formed by the extending direction of the blood vessel and a plane direction in which the scan slice images are present is relatively small (e.g., substantially parallel to each other), it is possible to obtain a complete centerline of the blood vessel by using only a small number of slice images. Consequently, it is preferable to implement the LMIP process on scan slice images in which the angle formed by the plane direction of presence and the extending direction of the blood vessel is relatively small.

Figure 5:
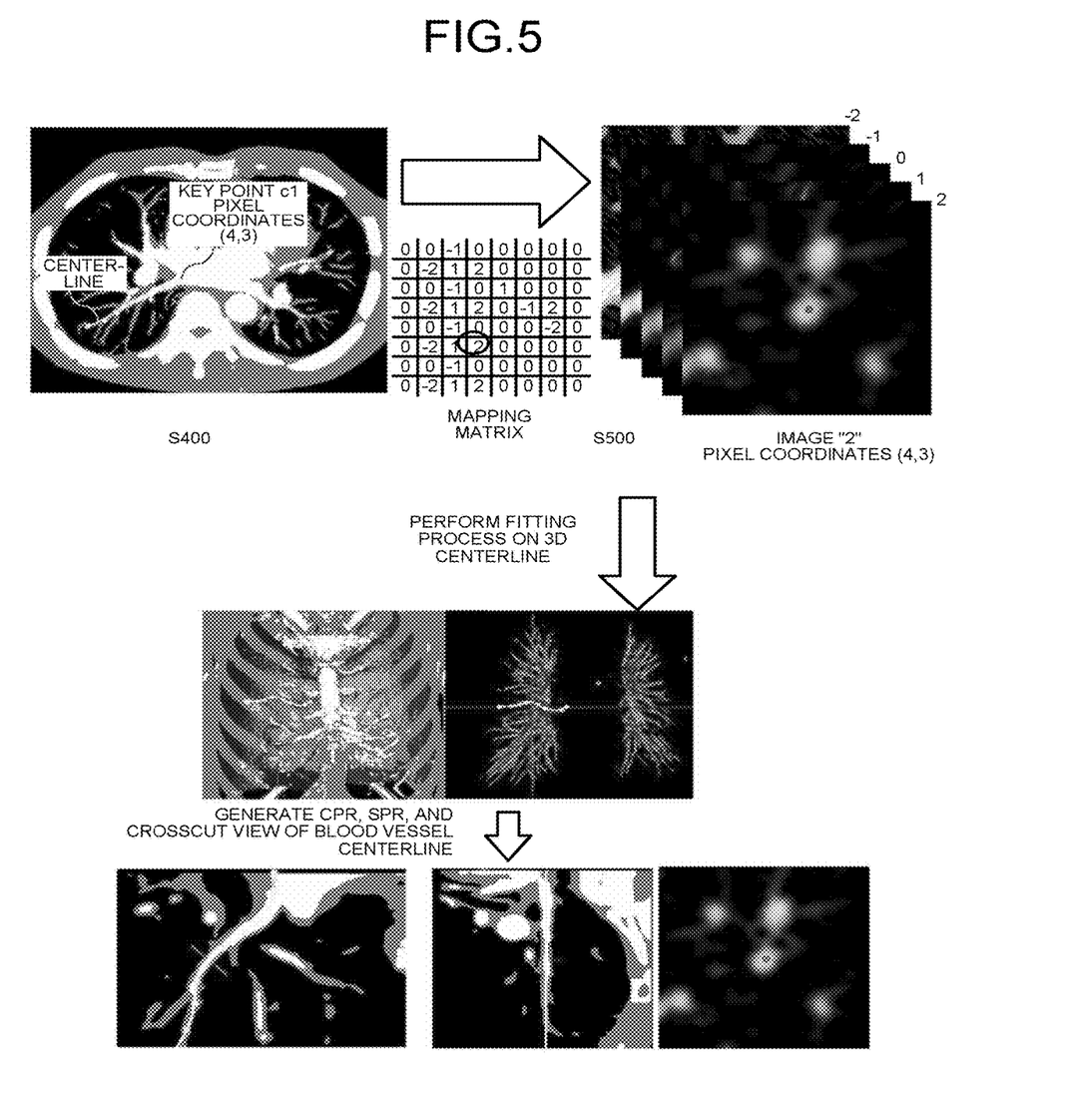
FIG. 5 is a conceptual drawing illustrating operations performed at steps S400 through S500.

FIG. 5 is a conceptual drawing illustrating operations performed at step S400 through S500.

The top left section of FIG. 5 illustrates the LMIP image obtained at step S200, which is an axial LMIP image, for example.

As illustrated in FIG. 5, according to the tubular organ annotation method in the embodiment, at step S400, the centerline of the blood vessel is annotated in the LMIP image obtained at step S200. For example, by using a manual method or a publicly-known automatic method in the relevant field, it is possible to annotate key points on the blood vessel centerline in the LMIP image. The key points may be important position points confirmed on the basis of shape characteristics of the blood vessel and may be, for example, a start point, an end point, an apparent bending point, a branch point, and/or the like. Further, at the time of selecting the key points, it is possible to avoid certain points overlapping with gaps between the blood vessels in the LMIP image.

After the key points on the centerline of the blood vessel were annotated in the LMIP image at step S400, the key points are inversely mapped, at step S500, onto the original three-dimensional volume data, while using the mapping matrix obtained at step S300, with respect to the pixel positions of the annotated key points in the LMIP image.

In the following sections, an operation at step S500 will be explained more specifically. The LMIP will be explained by using, again, the example of the 8*8 matrix explained with reference to FIG. 2 and the five images in total, namely Images −2, −1, 0, 1, and 2.

When it is known that the LMIP image is structured by the 8*8 pixels, all the pixel positions of the points in the LMIP image are already known. As for bright lines in the LMIP image in the top left section of FIG. 5, for example, the key points on the blood vessel centerline annotated at step S400 are indicated. Among these key points, let us imagine about a key point c1 positioned at a blood vessel root part that the point c1 is a pixel in the fourth place in the left-and-right direction and the third place in the up-and-down direction among the 8*8 pixels. In this situation, the pixel position of c1 can be expressed as (4,3). When the index value corresponding to the pixel position (4,3) in the mapping matrix is "2", i.e., the pixel value in Image "2" among the five images (−2, −1, 0, 1, 2) is adopted in the pixel position (4,3), the pixel value in Image "2" is maximum in the pixel position (4,3). Accordingly, as a result of inversely mapping the key point cl, the point at the pixel coordinates (4,3) in Image "2" among the plurality of successive slice images is confirmed as a seed point that is on the blood vessel centerline in a three-dimensional space and that corresponds to cl in the LMIP image.

By repeating this process so as to perform the inverse mapping on all the key points annotated in the LMIP image at step S400, it is possible to obtain seed points on the blood vessel centerline in a three-dimensional space, by obtaining three-dimensional spatial coordinates of the seed points on the 3D centerline structured with pixel coordinates (e.g., (4,3) above) and image numbers (e.g., "2" above).

A basic operation at step S500 has thus been explained. Further, at step S500, it is also possible to perform a fitting process on the 3D centerline of the blood vessel in the three-dimensional space, by implementing a publicly-known fitting method in the relevant field, while using the seed points on the blood vessel centerline in the three-dimensional space obtained by the inverse mapping. Further, by using a known image processing method, it is also possible, for various medical application use, to generate a Curved Planar Reconstruction (CPR) image, a Stretched curved Planar Reconstruction (SPR) image, or a crosscut view, of the blood vessel centerline on the basis of the fitted 3D centerline. In this situation, the fitting process and the process of generating the CPR image, the SPR image, or the crosscut view are not required at step S500 and may be omitted.

Figure 6A:
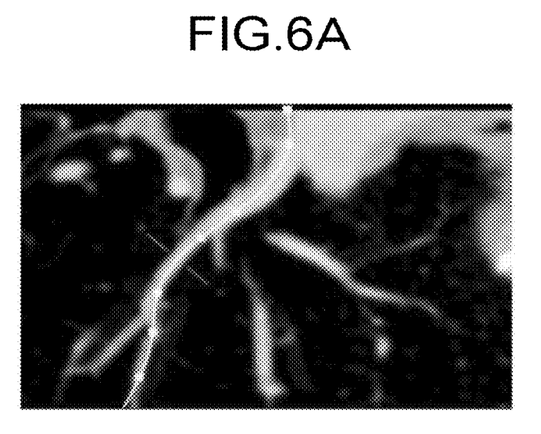
FIG. 6A is a conceptual drawing illustrating an operation performed at step S600.
Figure 6B:
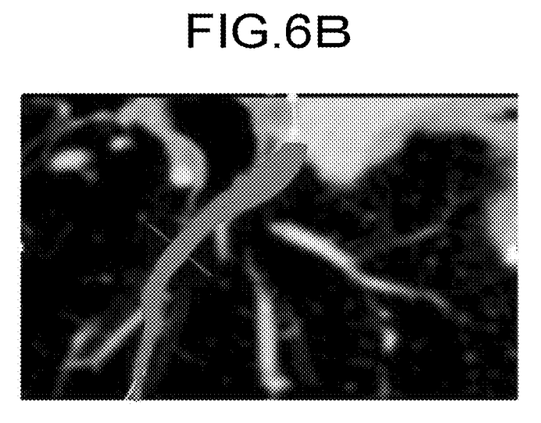
FIG. 6B is a conceptual drawing illustrating an operation performed at step S600.

FIG. 6 is a conceptual drawing illustrating an operation performed at step S600.

At step S600, the three-dimensional blood vessel annotation is completed under the guidance of the obtained seed points. More specifically, it is acceptable, as illustrated in FIG. 6A, to directly use the centerline fitted on the basis of the seed points obtained at step S500, for example, as sparse labeling blood vessel GT. Alternatively, it is also acceptable, as illustrated in FIG. 6B, to generate a complete blood vessel region, as a result of the user further implementing human-powered annotation or a conventional adaptive threshold method or the like, for example, on the basis of the fitted blood vessel centerline.

It is possible to realize step S600 by using a publicly-known arbitrary method in the relevant field. For example, the process of generating the complete blood vessel region from the fitted blood vessel centerline may be realized, by implementing a conventional blood vessel segmentation method based on image intensities or geometrical characteristics or by implementing a segmentation method based on Deep Learning (DL). Thus, specific explanations of the details thereof will be omitted.

The tubular organ annotation method based on the guidance of the local intensity projection according to the first embodiment has thus been explained. As explained above, in the embodiment, while making use of the characteristic where the local intensity projection is able to strengthen the intensities and the geometrical shape connectivity of the tubular organ (e.g., a blood vessel or the trachea) in the image, the key points on the centerline of the tubular organ are annotated in the LMIP image, so that the centerline of the tubular organ is easily distinguished from the other noise waves (other blood vessels/diseased regions/noise), while the LMIP strengthens the geometrical connectivity. It is therefore possible to annotate even very small blood vessel points. By inversely mapping the center points annotated by the LMIP onto the original image while using the constructed index relationship mapping matrix, the centerline of the tubular organ in the three-dimensional space is generated.

Further, the embodiment may include various modifications. For example, in the first embodiment described above, the LMIP and the subsequent annotation and inverse mapping processes are performed once, only on the single set made up of the plurality of (e.g., five) slice images. However, by performing the LMIP and the annotation and inverse mapping processes multiple times on each of a plurality of sets of slice images, it is possible to obtain a better annotation result of the 3D blood vessel centerline. Further, performing the LMIP process once only on a single set of slice images is effective, when the annotation is performed on a single blood vessel. In contrast, when the user wishes to perform annotation on a plurality of blood vessels in the entire pulmonary blood vessel system, it is possible to realize this implementation by performing the LMIP and the annotation and inverse mapping processes described above on each of a plurality of sets of slice images.

Figure 7:
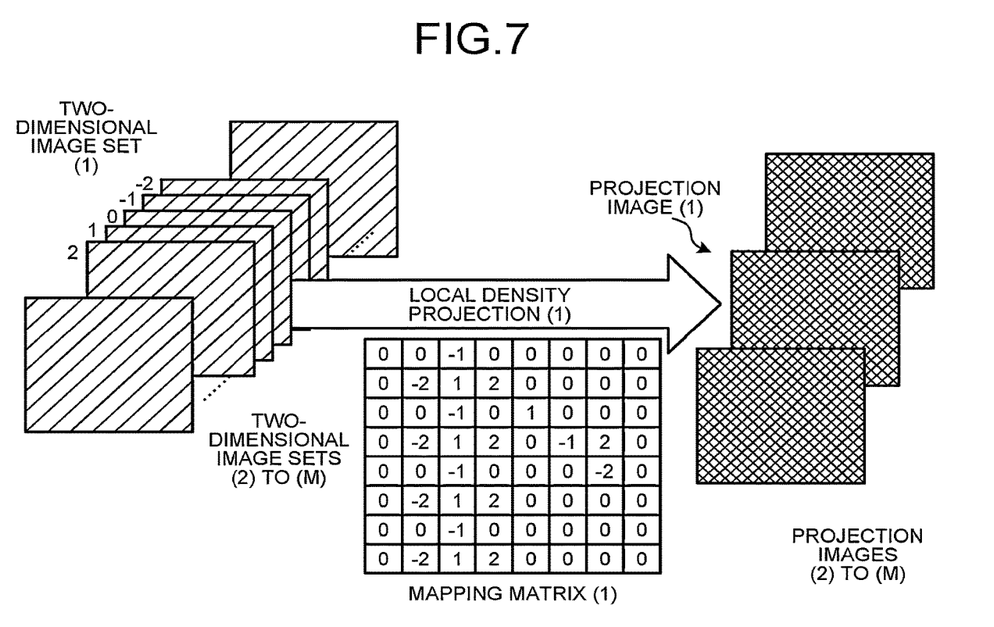
FIG. 7 is a conceptual drawing for explaining an intensity projection process performed on a plurality of sets of two-dimensional images according to a first modification example of the first embodiment.

FIG. 7 is a conceptual drawing for explaining an intensity projection process performed on a plurality of sets of two-dimensional images on the basis of a first modification example of the first embodiment. As illustrated in FIG. 7, similarly to the first embodiment, projection image (1) is obtained by implementing local intensity projection (1) on set (1) of two-dimensional images numbered −2, −1, 0, 1, and 2, among the plurality of two-dimensional images structuring three-dimensional volume data, and also corresponding mapping matrix (1) is obtained. In addition, it is also acceptable to obtain projection images (2) to (M) by implementing local intensity projections (2) to (M) on other plurality of sets (2) to (M) of two-dimensional images as well as mapping matrices (2) to (M) that correspond thereto. (Local intensity projections (2) to (M) and mapping matrices (2) to (M) are omitted from the drawing). In projection images (2) to (M), for example, mutually-different blood vessels are annotated, so that the annotated blood vessels are inversely mapped onto the respective pieces of three-dimensional volume data by using corresponding mapping matrices (2) to (M), so as to be eventually combined with a plurality of blood vessels in the pulmonary blood vessel system.

The quantity of the images included in the plurality of sets of two-dimensional images may be equal to one another. For example, the images in set (1) of two-dimensional images may be shifted forward (or rearward) by one (or more) image so as to structure another image set. By repeating this process multiple times, a plurality of sets of two-dimensional images may be formed. Needless to say, the quantity of the two-dimensional images in each set may vary among the plurality of sets. For example, it is possible to select the quantity of the two-dimensional images in each set as appropriate, in accordance with the length, the extending direction, and/or the like of the target blood vessel. Further, because it is possible to realize the abovementioned combining process by using a publicly-known arbitrary method in the relevant field, detailed explanations thereof will be omitted.

To summarize, according to the first modification example of the first embodiment, it is possible to obtain the projection images by implementing the local intensity projection on each of the plurality of sets of two-dimensional images. Further, in the mapping matrix obtaining step, the mapping matrix is obtained with respect to each of the plurality of sets of two-dimensional images. In the annotation step, the tubular organ is annotated in each of the plurality of projection images. In the inverse mapping step, the tubular organ is inversely mapped onto the three-dimensional volume data by using the mapping matrix corresponding to each of the sets, so as to combine a three-dimensional tubular organ image.

Further, for example, in the first embodiment described above, the LMIP and the subsequent annotation and inverse mapping processes are performed only on the slices images in a single direction such as coronal images; however, when there is a spatial intersection with another blood vessel due to blood vessel extending directions or at the location of a certain blood vessel, it may be impossible, in some situations, to obtain an accurate blood vessel centerline, by simply performing the LMIP image annotation and the inverse mapping in a single direction. In those situations, it is possible to obtain a more satisfactory annotation result of a 3D blood vessel centerline, by implementing the LMIP annotation and the inverse mapping in a plurality of directions.

In other words, in a second modification example of the first embodiment, projection images in the plurality of direction are obtained by implementing the local intensity projection on each of two-dimensional images in the plurality of directions structuring three-dimensional volume data. Accordingly, in the mapping matrix obtaining step, a mapping matrix corresponding to each of the plurality of directions is obtained. In the annotation step, the tubular organ is annotated in each of the projection images in the plurality of directions. In the inverse mapping step, key points on the LMIP tubular organ centerlines corresponding to the plurality of directions are inversely mapped onto the three-dimensional volume data by using the mapping matrices corresponding to the directions, so as to eventually combine a three-dimensional tubular organ image.

Further, at step S200, the quantity of the plurality of two-dimensional images used for generating the LMIP image is variable. It is possible to select the quantity of the images used for generating the LMIP image in accordance with actual situations. The larger the quantity of the two-dimensional images used for generating the LMIP image is, the more ideal will be the effects of the intensity and the geometrical shape connectivity of the tubular organ in the LMIP projection image to be acquired. However, the data processing amount will increase as much. In the embodiment, it is possible to select the quantity of the images used for generating the LMIP image, in accordance with actual situations, so as to balance between the data processing amount and the LMIP effects. For example, the quantity of the images used for generating the LMIP image may be decreased, as the distribution of the tubular organs becomes denser, for example.

Next, a tubular organ annotation system according to the first embodiment will be explained.

Figure 8:
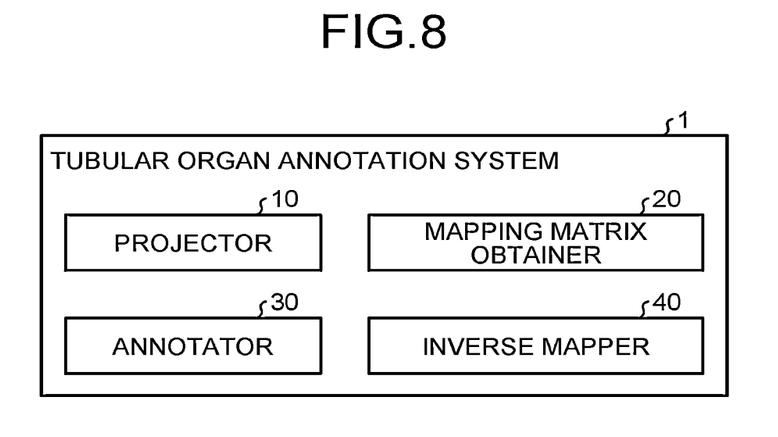
FIG. 8 is a functional block diagram illustrating a tubular organ annotation system according to the first embodiment.

FIG. 8 is a functional block diagram illustrating a tubular organ annotation system according to the first embodiment. As illustrated in FIG. 8, a tubular organ annotation system 1 according to the first embodiment includes: a projector 10 configured to obtain a projection image by implementing a local intensity projection on two-dimensional images structuring three-dimensional volume data rendering a tubular organ; a mapping matrix obtainer 20 configured to obtain a mapping matrix of the local intensity projection implemented by the projector 10; an annotator 30 configured to annotate the tubular organ in the projection image; and an inverse mapper 40 configured to generate a three-dimensional tubular organ image, by inversely mapping the tubular organ annotated in the projection image onto the three-dimensional volume data, while using the mapping matrix. Because the processes performed by the functional modules in the tubular organ annotation system according to the embodiment respectively correspond to the steps in the tubular organ annotation method described above, detailed explanations thereof will be omitted.

The tubular organ annotation system 1 is an example of a medical image processing apparatus. The projector 10 is an example of a projection unit. The mapping matrix obtainer 20 is an example of a mapping matrix obtaining unit. The annotator 30 is an example of an annotation unit. The inverse mapper 40 is an example of an inverse mapping unit.

It is possible to integrate or separate any of the constituent elements included in the tubular organ annotation system 1, as appropriate. For example, a specific processor may function as the tubular organ annotation system 1, as a result of reading and executing programs respectively corresponding to the projector 10, the mapping matrix obtainer 20, the annotator 30, and the inverse mapper 40.

In other words, the tubular organ annotation system 1 includes processing circuitry capable of executing the programs respectively corresponding to the projector 10, the mapping matrix obtainer 20, the annotator 30, and the inverse mapper 40 described above. The processing circuitry may be realized by combining together a plurality of processors or may be realized by using a single processor.

By inversely mapping the tubular organ annotated by the annotator 30 onto the three-dimensional volume data, the inverse mapper 40 is configured to identify the tubular organ in the three-dimensional volume data. In this situation, the inverse mapper 40 may or may not generate a three-dimensional tubular organ image according to the result of identifying the tubular organ in the three-dimensional volume data. For example, the inverse mapper 40 may be configured to set a three-dimensional coordinate system in which the three-dimensional volume data is arranged, so as to record three-dimensional coordinates of the tubular organ identified in the three-dimensional volume data. When the three-dimensional coordinates are recorded in this manner, it is possible to use the three-dimensional coordinates as supervisor data in machine learning or to cause an arbitrary apparatus to generate a three-dimensional tubular organ image.

The tubular organ annotation method and system according to the first embodiment have thus been explained. According to the first embodiment, the centerline key points of the tubular organ are annotated in the LMIP image. Thus, the centerline of the tubular organ is easily distinguished from the other noise waves (other blood vessels/diseased regions/noise). In addition, the LMIP strengthens the geometrical connectivity. It is therefore possible to annotate even very small blood vessel points. On the basis of the constructed index relationship mapping matrix, the center points annotated by the LMIP are inversely mapped onto the original image, so as to generate the centerline of the tubular organ in the three-dimensional space.

Second Embodiment

In a second embodiment, the tubular organ annotation method according to the first embodiment is applied to correcting a tubular organ annotation result.

When initial annotation of a blood vessel GT region has already been completed by using a number of traditional algorithms such as a threshold method, a clinician is required, in many situations, to inspect and edit blood vessel branches that are wrong or missing in the annotation result. When there are a relatively large number of blood vessels in a blood vessel tree, it is difficult to inspect to determine which blood vessel is missing or interrupted in the annotation result.

For this reason, in the second embodiment, the tubular organ annotation method according to the first embodiment is applied to correcting a tubular organ annotation result, to make it easier for a user to immediately recognize which blood vessel branch is missing or interrupted, by comparing the LMIP image with a corresponding blood vessel region that is annotated in advance. After that, by using the method according to the first embodiment, it is possible to correct the missing or interrupted part in the LMIP image.

Next, the second embodiment will be explained in detail, with reference to drawings.

Figure 9:
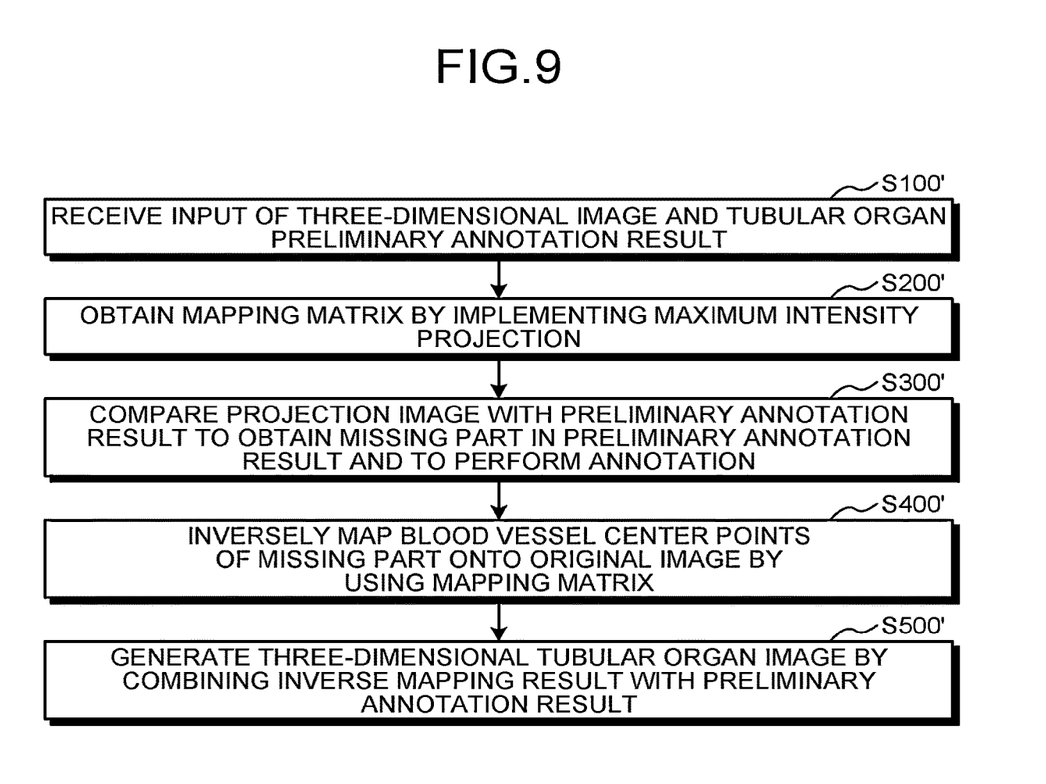
FIG. 9 is a flowchart illustrating a method for correcting a tubular organ annotation result according to a second embodiment.

FIG. 9 is a flowchart illustrating a method for correcting a tubular organ annotation result according to the second embodiment.

As illustrated in FIG. 9, the method for correcting the tubular organ annotation result according to the embodiment includes the following steps:

At step S100', an input is received of the three-dimensional volume data rendering the tubular organ and a preliminary annotation result obtained by annotating the tubular organ in the three-dimensional volume data.

At step S200', an LMIP projection image is obtained by implementing a local maximum intensity projection, for example, on the two-dimensional images structuring the three-dimensional volume data. Further, a mapping matrix of the local maximum intensity projection is obtained.

At step S300', the LMIP projection image obtained at step S200' is compared with the preliminary annotation result received as the input at step S100', so as to obtain a missing part of the tubular organ in the preliminary annotation result and to also annotate the missing part of the tubular organ in the LMIP projection image.

At step S400', blood vessel center points of the missing part of the tubular organ annotated in the LMIP projection image are inversely mapped onto the three-dimensional volume data by using the mapping matrix.

At step S500', a three-dimensional tubular organ image is generated by combining the result of the inverse mapping with the preliminary annotation result.

Next, the abovementioned steps will be explained in detail, with reference to drawings.

Because the details of the process at step S200' of implementing the local maximum intensity projection and obtaining the mapping matrix of the local maximum intensity projection are the same as those of the corresponding step in the first embodiment and the description referring to FIG. 2, specific explanations thereof will be omitted.

Figure 10:
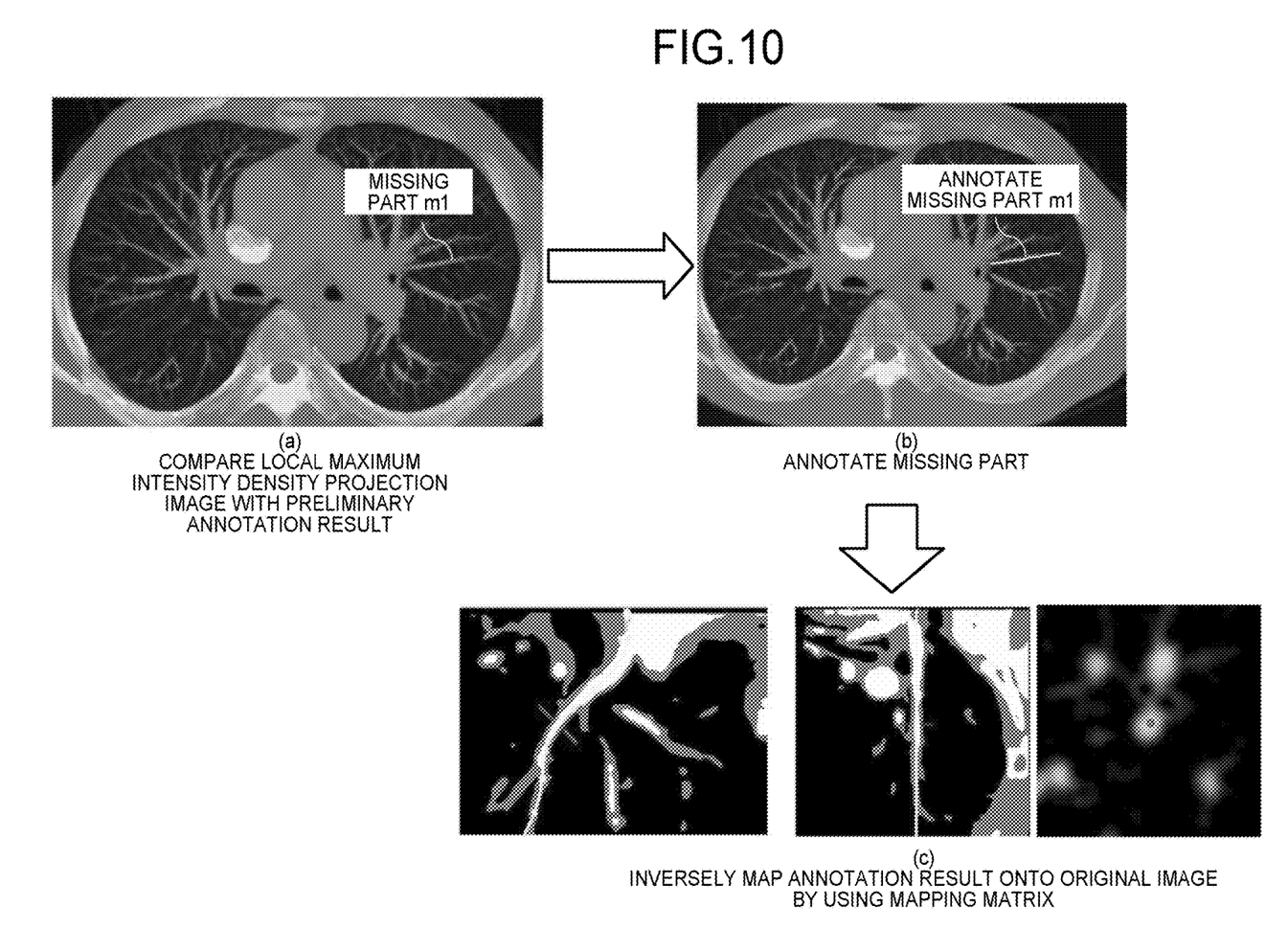
FIG. 10 is a conceptual drawing illustrating operations performed at steps S300' and S400'.

FIG. 10 is a conceptual drawing illustrating operations performed at steps S300' and S400'.

As illustrated in FIG. 10(a), the maximum intensity projection image (the part in gray (or a dark color) in the blood vessel pattern in the upper left section of FIG. 10) is compared with the preliminary annotation result (the part in red (or a bright color) in the blood vessel pattern). By simply displaying the two images in a superimposed manner, for example, it is understood that the maximum intensity projection image includes more blood vessel information. For example, in FIG. 10(a), the middle part on the right side includes a blood vessel pattern ml in gray, which is not covered by the red blood vessel pattern. The gray blood vessel pattern is a missing part of the tubular organ (the blood vessel) in the preliminary annotation result. Accordingly, as illustrated in FIG. 10(b), at step S300', annotation is implemented as described at step S400 in the first embodiment on the missing part ml. Subsequently, as illustrated in FIG. 10(c), the inverse mapping and the fitting process, or the like as described at step S500 in the first embodiment are performed on the annotated missing part, by using the mapping matrix.

The missing part may be an entire blood vessel that is missing or may be, needless to say, a missing part of the blood vessel such as a missing branch, a missing distal end part, or a missing section.

In this situation, steps S300' through S400' are realized with the corresponding steps in the tubular organ annotation method explained in the first embodiment. More specifically, the annotation at step S300' and the inverse mapping at step S400' correspond to steps S400 and S500 in the first embodiment. The difference lies only in that steps S400 and S500 in the first embodiment are performed on the entire blood vessel, whereas steps S300' and S400' in the present embodiment are performed on the missing part obtained as a result of the comparison at step S300'. Thus, detailed explanations thereof will be omitted.

It is possible to realize the other processes such as the comparison at step S300', the combining process at step S500', and the like, for example, by using a publicly-known technique in the relevant field. Thus, detailed explanations thereof will be omitted.

In addition to the advantageous effects of the first embodiment, the second embodiment is also able to achieve an advantageous effect where it is possible to correct a preliminary annotation result of a tubular organ such as a blood vessel, for example, obtained by implementing another method.

The method for correcting the tubular organ annotation result according to the second embodiment has thus been explained. Needless to say, it is possible to realize the second embodiment as a system or an apparatus corresponding to the tubular organ annotation result correcting method.

OTHER EMBODIMENTS

The present disclosure is not limited to the embodiments described above and may be modified in various manners.

For example, although the blood vessel was used as an example, the embodiments described above may be applied to other organs having a tubular structure such as the trachea.

Further, although the local intensity projections such as the local maximum intensity projection and the local minimum intensity projection were so far explained as examples of the intensity projections, possible embodiments are not limited to these examples. In other words, a projection image may be generated by implementing an intensity projection that uses the entirety of volume data instead of a part of the volume data. For example, when the acquired volume data is data acquired with respect to a small range in the body-axis direction of the patient or is data acquired with respect to a body site of the patient that is not so thick, it is possible to generate a projection image by implementing an MIP that uses the entirety of the volume data, in place of the LMIP.

Further, although the maximum intensity projection and the minimum intensity projection were so far explained as examples of the intensity projections, possible embodiments are not limited to these examples. For instance, an average intensity projection may be implemented as an intensity projection. The average intensity projection is a method by which an average value of the pixels included in the projection direction is used as a pixel value of the projection image. For example, as illustrated in FIG. 2A, when the pixel values in a certain image position in the five slice images are 135, 166, 238, 141, and 169, for example, the average value "169.8" of the pixel values of the five slice images is determined as a pixel value in that pixel position in the projection image obtained by implementing the average intensity projection. The projection image from the average intensity projection has lower contrast compared to a projection image from the maximum intensity projection or the minimum intensity projection, and thus, noise is less easily emphasized.

When the projection image is generated by implementing the average intensity projection, the mapping matrix may indicate a two-dimensional image having the maximum pixel value among the plurality of two-dimensional images or may indicate a two-dimensional image having the minimum pixel value among the plurality of two-dimensional images. In other words, the mapping matrix used at the time of generating a projection image by implementing the average intensity projection may be the same as the mapping matrix used at the time of generating a projection image by implementing the maximum intensity projection or the minimum intensity projection.

The system according to any of the embodiments may be installed in a medical device as circuitry capable of realizing the function described in the embodiments. The system also may be distributed after being stored, as a computer-executable program, in a storage medium such as a magnetic disk (e.g., a floppy [registered trademark] disk or a hard disk), an optical disk (e.g., a Compact Disk Read-Only Memory [CD-ROM], a Digital Versatile Disk [DVD], or Blu-ray Disk [BD]), a Magneto-Optical (MO) disk, or a semiconductor memory.

Further, on the basis of instructions of a program installed from the storage medium into a computer, a part of the processes for realizing any of the embodiments described above may be performed by an Operating System (OS) working in the computer or middleware (MW) such as database management software or network software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
processing circuitry configured to:
generate two or more projection images by implementing a local intensity projection on each of two or more sets of two-dimensional images obtained from a plurality of two-dimensional images structuring three-dimensional volume data rendering a tubular organ;
obtain a mapping matrix of the local intensity projection with respect to each of the sets;
annotate the tubular organ in each of the projection images; and
identify the tubular organ in the three-dimensional volume data, by inversely mapping the tubular organ annotated in the projection images onto the three-dimensional volume data while using the mapping matrix corresponding to each of the sets.

2. The medical image processing apparatus according to claim 1, wherein the processing circuitry is further configured to generate a three-dimensional tubular organ image, by inversely mapping the tubular organ annotated in the projection images onto the three-dimensional volume data while using the mapping matrix.

3. The medical image processing apparatus according to claim 1, wherein
the mapping matrix indicates, with respect to each of pixels in the projection images, a correspondence relationship as to which one of the plurality of two-dimensional images corresponds to the pixel,
based on the correspondence relationship, the processing circuitry is further configured to identify a two-dimensional image corresponding to each of pixels of the tubular organ annotated in the projection images in accordance with a pixel position of the pixel, and
the processing circuitry is further configured to generate a three-dimensional tubular organ image, by using the pixel positions and image number information indicating an ordinal number of a sequential position of each of the identified two-dimensional images among the plurality of two-dimensional images.

4. The medical image processing apparatus according to claim 1, wherein
the processing circuitry is further configured to annotate a key point on a centerline of the tubular organ, and
the processing circuitry is further configured to generate a key point on a centerline of the tubular organ that is three-dimensional.

5. The medical image processing apparatus according to claim 4, wherein the processing circuitry is further configured to perform a fitting process on the centerline of the three-dimensional tubular organ, based on the key point on the centerline of the three-dimensional tubular organ, and
the processing circuitry is further configured to annotate a three-dimensional tubular organ image on a basis of the centerline of the fitted three-dimensional tubular organ.

6. The medical image processing apparatus according to claim 1, wherein the processing circuitry generates the projection images corresponding to each of a plurality of directions, by implementing the local intensity projection on each of the two-dimensional images structuring the three-dimensional volume data and corresponding to the plurality of directions,
the processing circuitry is further configured to obtain the mapping matrix corresponding to each of the plurality of directions,
the processing circuitry is further configured to annotate the tubular organ in each of the projection images corresponding to the plurality of directions, and
the processing circuitry is further configured to identify the tubular organ in the three-dimensional volume data, by inversely mapping the tubular organ corresponding to the plurality of directions onto the three-dimensional volume data, while using the mapping matrix corresponding to each of the directions.

7. The medical image processing apparatus according to claim 1, wherein a quantity of the two-dimensional images to be used for generating the projection images is variable.

8. The medical image processing apparatus according to claim 1, wherein the tubular organ is a blood vessel.

9. A medical image processing apparatus, comprising:
processing circuitry configured to:
    generate two or more projection images by implementing a local intensity projection on each of two or more sets of two-dimensional images obtained from a plurality of two-dimensional images structuring three-dimensional volume data rendering a tubular organ;
    obtain a mapping matrix of the local intensity projection with respect to each of the sets;
    compare the projection images with a preliminary annotation result obtained by annotating the tubular organ in the three-dimensional volume data, so as to obtain a missing part of the tubular organ in the preliminary annotation result and to further annotate the missing part of the tubular organ in the projection images; and
    identify the missing part of the tubular organ in the three-dimensional volume data, by inversely mapping the missing part of the tubular organ annotated in the projection images onto the three-dimensional volume data while using the mapping matrix corresponding to each of the sets, and further combining a result of the inverse mapping with the preliminary annotation result.

10. A medical image processing method, comprising:
    a projection step of generating two or more projection images by implementing a local intensity projection on each of two or more sets of two-dimensional images obtained from a plurality of two-dimensional images structuring three-dimensional volume data rendering a tubular organ;
    a mapping matrix obtaining step of obtaining a mapping matrix of the local intensity projection with respect to each of the sets implemented in the projection step;
    an annotation step of annotating the tubular organ in each of the projection images; and
    an inverse mapping step of identifying the tubular organ in the three-dimensional volume data, by inversely mapping the tubular organ annotated in the projection images onto the three-dimensional volume data while using the mapping matrix corresponding to each of the sets.

\* \* \* \* \*